Patented Mar. 26, 1929.

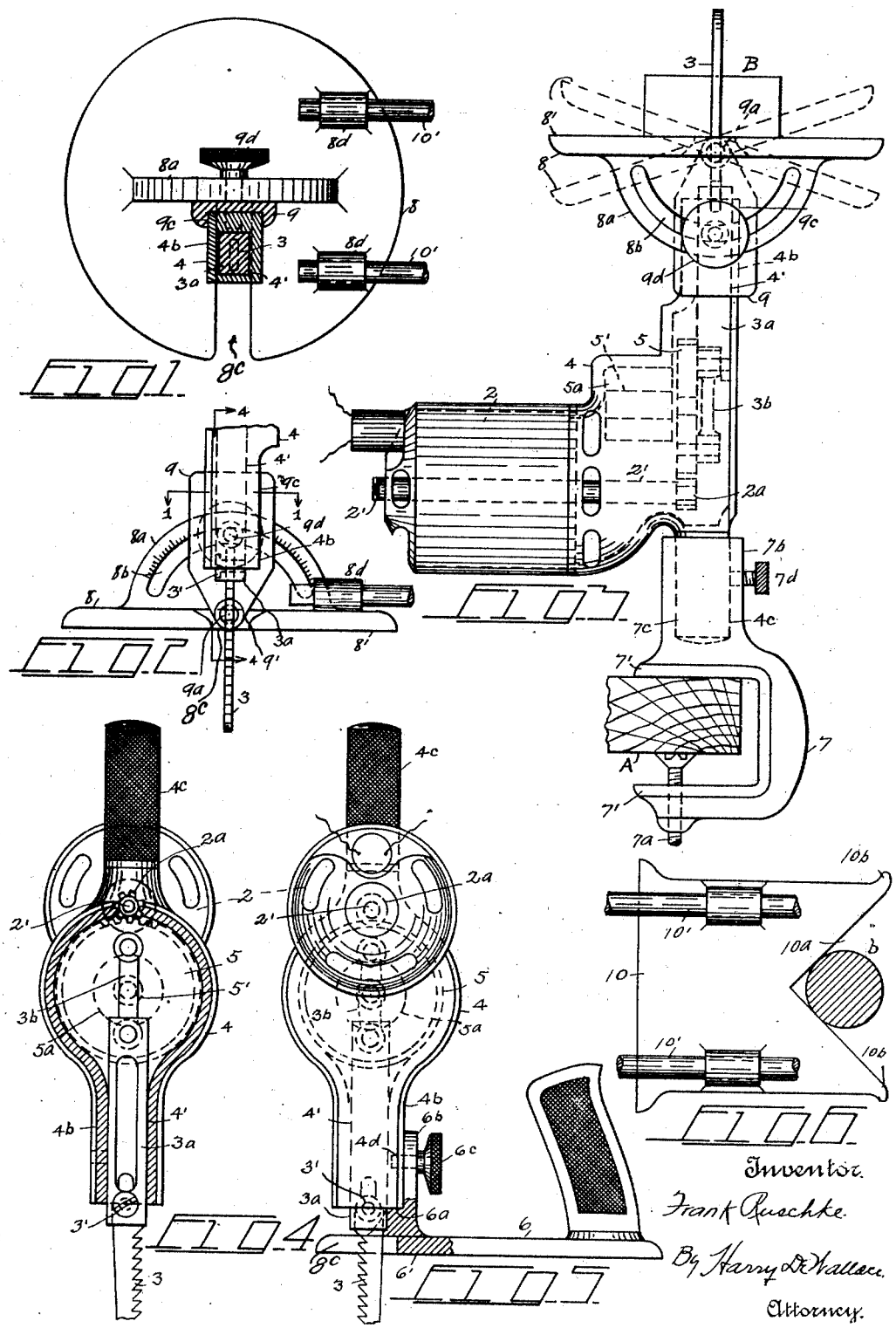

1,707,097

UNITED STATES PATENT OFFICE.

FRANK RUSCHKE, OF SYRACUSE, NEW YORK.

POWER HAND AND BENCH SAW.

Application filed August 22, 1927. Serial No. 214,745.

This invention relates to a portable power-driven saw, designed particularly for use by machinists, tool-makers, and the like, for sawing metal or wood, and has for its object to provide a novel, simple and convenient sawing device adapted for either hand or bench work. A further object is to provide a motor driven reciprocating saw, the motor and saw being supported by a hollow casing which encloses the driving mechanism, said casing having means for manually propelling the device. A further object is to provide means for rigidly mounting the sawing mechanism upon a bench or other fixed support, upon which the device is adjustable for sawing in different directions. A further object is to provide a work-table which is arranged to be adjustably supported by the casing, and to enable the operator to feed the work towards the saw, the said table being tiltable for effecting cuts at different angles to the plane of the saw, and being equipped with means for gaging angular as well as round work.

I attain these objects by the means set forth in the detailed description which follows, and as illustrated by the accompanying drawing, in which—

Figure 1 is a horizontal section, taken on line 1—1 of Fig. 2. Fig. 2 is a front side elevation of the table, and a broken view of the casing enclosing the sawing mechanism. Fig. 3 is a rear-end elevation, showing the sawing device, bench clamp, and the tiltable table, connected as one part, the sawing device and table being inverted. Fig. 4 is a vertical longitudinal section, taken substantially on line 4—4 of Fig. 2, the table and clamp being omitted; showing the mechanism that reciprocates the saw. Fig. 5 is a rear-side elevation of the same, showing a detachable support for facilitating manual propelling of the device. And Fig. 6 is the top plan view of means supportable by the table for gaging round, as well as, angular work.

In the drawing, 2 represents an electric motor, having a shaft 2', that actuates a reciprocating saw 3. The motor is preferably of the enclosed type, and one end of its covering is supported by a hollow casing 4, in which is disposed all of the working parts that connect shaft 2' with the saw. 2ª represents a pinion mounted on shaft 2', that drives a relatively large spur-gear 5, which is mounted on a shaft 5', the latter being journaled in bearings indicated conventionally at 5ª, in Figs. 3, 4 and 5.

The saw 3 is detachably secured, by a screw 3', to the outer end of a member 3ª, that slides in a way 4' formed in a reduced depending portion or leg 4ᵇ of the casing, the member 3ª being reciprocated by a pitman 3ᵇ, which connects respectively to the gear 5 and the inner end of said member. The casing 4 is provided at its top end with a knurled extension 4ᶜ, by which the device may be supported manually, for effecting simple cuts, when the nature of the work requires the device to be held and propelled by the operator. The manual propulsion of the device may be facilitated by a detachable bracket or base 6, which is provided with a plane bottom 6', that may rest upon a surface of the work, and an L-shaped seat, comprising a bed 6ª and an upright perforated abutment or lug 6ᵇ, which receives the free end of the leg 4ᵇ, the latter being formed with a threaded opening 4ᵈ to receive a screw 6ᶜ. By this arrangement the operator may propel as well as guide the device, by the use of his two hands.

For many other classes of work, it is desirable to mount the sawing device of Figs. 3 and 4 upon a bench or like fixed support, as A, and for this purpose I provide a clamp 7, which is formed with parallel jaws 7' that receive and grip an edge of the bench, the clamp 7 being made rigid by means of a screw 7ª. Clamp 7 is formed with a hub 7ᵇ that projects above the bench, and has an upwardly facing socket 7ᶜ, into which the handle 4ᶜ of the inverted casing may be inserted, as shown in Fig. 3. By this arrangement the sawing device may be normally retained in its inverted position by gravity. When more precise or accurate work is to be done, the parts 4 and 7 are preferably made rigid when adjusted, by means of a set-screw 7ᵈ (see Fig. 3). When the sawing device is mounted on the bench A, it is necessary to provide a suitable elevated support for the work, as B, over which the latter may be moved towards the saw 3 by the operator. To this end, I provide a preferably circular work table 8, having a plane bottom 8', which is adapted to rest upon and slide over certain work, when the sawing mechanism and table are in the positions shown in Figs. 1 and 2, and propelled by hand. When however, the device is employed in connection with regular bench work (see Fig. 3), the table as well as the sawing mechanism are preferably inverted, which disposes the plane surface 8' of the table upwardly, and the work B is slidably mounted on the said surface. The normal top side of the table (see Figs. 1 and 2) is formed with a semi-circular upstanding rib 8ª, having a concentric slot 8ᵇ, one margin of said slot being provided with degree graduations, which may be read in opposite directions, in the usual manner. To connect the casing 4 to the table 8, I provide a shoe 9, having a V-pointed end 9′ which is perforated to receive a screw 9ª, by which the shoe is pivotally attached to the medial base portion of the rib 8ª. The lateral swinging of the shoe 9′ relatively to the plane 8′ enables the saw 3 to cut the work at different angles, in a well-known manner. The shoe 9 is formed with a longitudinal groove or socket 9ᶜ which receives the leg 4ᵇ of the casing, and a screw 9ᵈ inserted through the slot 9ᶜ and engaging the opening 4ᵈ of the leg, tends to hold the parts in various adjusted positions, as shown in Fig. 3. The table 8 is formed with a radial slot 8ᶜ, for the free entry and play of the saw 3, and its normal top surface (see Figs. 1 and 2) is formed with spaced guide-loops 8ᵈ, for supporting and affording adjustment for gage member 10 (see Fig. 6), which is usually adjustably mounted upon parallel rods 10′ that slidably engage the said loops. The member 10 is formed with a V-shaped cut-out 10ª, which may be employed for gaging round work, as b, of different diameters. The points 10ᵇ of the said V-opening may be utilized for gaging plane surfaces. The rods 10′ may be used without the member 10 for gaging angular parts, in a well-known manner.

Having thus described my invention, what I claim, is—

1. A hand and bench sawing device, comprising a power-driven blade, a casing enclosing the driving parts having a reduced portion, a work table, a shoe pivoted to said table having a socket to receive said reduced portion, and means engaging a part of the table and penetrating said shoe and said reduced portion for operatively connecting said parts.

2. A hand and bench sawing device, comprising a power-driven blade, a casing enclosing the driving mechanism having a reduced portion, a work table having a slotted rib, a shoe pivoted to said rib having a socket to receive said reduced portion, and means engaging and playing in said slot and penetrating said shoe and said reduced portion for operatively connecting said parts.

3. A hand and bench sawing device comprising a power-driven reciprocating blade, a driving mechanism, a hollow casing housing said mechanism and having a leg supporting and guiding said blade, a work table supported by said leg, means to pivotally connect said leg to the table for enabling the table to be tilted at different angles relatively to the plane of the blade.

4. A sawing device including a power-driven reciprocating blade, a hollow casing housing the driving mechanism and having a reduced portion adjacent said blade, a work table, said table having a rib formed with an arc-shaped slot, a shoe pivoted to said rib and swingable on an axis concentric to said slot, said shoe having a socket to receive said reduced portion, and means for holding the shoe rigid to the reduced portion, said means adapted to play in said slot for adjusting the table relatively to said blade.

5. A sawing device, comprising a power-driven reciprocating blade, a driving mechanism, a hollow casing housing said mechanism and having a leg adjacent said blade, a work table supported by said leg, said table having a rib formed with an arc-shaped slot, a shoe pivoted to the medial portion of said table, said shoe having a socket adapted to receive said leg, and a screw passing loosely through said slot and said shoe and screwing into said leg for adjustably supporting said table on said casing.

6. In a portable sawing device, the combination with a saw blade; said shaft adapted to reciprocate a saw blade, and a gear-train interposed between said shaft and said saw, of a casing supporting the motor and enclosing the gear-train, the opposite sides of said casing being formed respectively with a leg and a handle, a tiltable table, a shoe pivoted to the table and swingable at angles to the plane of the table, said shoe having a socket adapted to receive the free end of said leg, and means for adjustably connecting the table, the shoe, and said casing.

7. In a hand and bench sawing device, a power driven reciprocating blade, a casing housing the driving means having a handle, and a bracket adapted to be clamped to a bench having an upwardly facing socket adapted to receive said handle and to enable said casing to be rotated on the axis of said socket.

In testimony whereof I affix my signature.

FRANK RUSCHKE.